United States Patent

[11] 3,634,132

[72] Inventors: Jose L. Camahort, Millbrae; Mario P. Gomez, Sunnyvale, both of Calif.
[21] Appl. No.: 38,648
[22] Filed: May 22, 1970
[45] Patented: Jan. 11, 1972
[73] Assignee: Lockheed Aircraft Corporation, Burbank, Calif.
Original application Aug. 19, 1968, Ser. No. 753,589, now Patent No. 3,573,969, dated Apr. 6, 1971. Divided and this application May 22, 1970, Ser. No. 38,648

[54] BORON NITRIDE COATED BORON FILAMENTS
3 Claims, 1 Drawing Fig.
[52] U.S. Cl. .................................................. 117/169 R, 117/106 R, 117/DIG. 10
[51] Int. Cl. .................................................. B44d 1/42
[50] Field of Search .................................................. 117/106 R, 169, 128, 231, DIG. 10, 100 B, 100 M, 118, 69

[56] References Cited
UNITED STATES PATENTS

| | | | |
|---|---|---|---|
| 2,865,715 | 12/1958 | Kamlet .......................... | 117/DIG. 10 |
| 3,321,337 | 5/1967 | Patterson ...................... | 117/106 X |
| 3,410,715 | 12/1968 | Hough .......................... | 117/128 |
| 3,451,840 | 6/1969 | Hough .......................... | 117/106 X |

Primary Examiner—Alfred L. Leavitt
Assistant Examiner—Wm. E. Ball
Attorneys—Richard H. Bryer and George C. Sullivan ABSTRACT: A method for surface nitriding boron filaments to make the filaments useful as reinforcement agents in composite materials. The method involves initially forming a liquid boron oxide coating on the filament, for example, by heating the filament at temperatures of from about 560° C. to 800° C. in an oxidizing atmosphere and then converting the liquid oxide coating to a solid, continuous boron nitride coating by, for example, heating the filament at temperatures of from about 600°C. to 1,100° C. in an nitrogen-containing atmosphere.

PATENTED JAN 11 1972 3,634,132
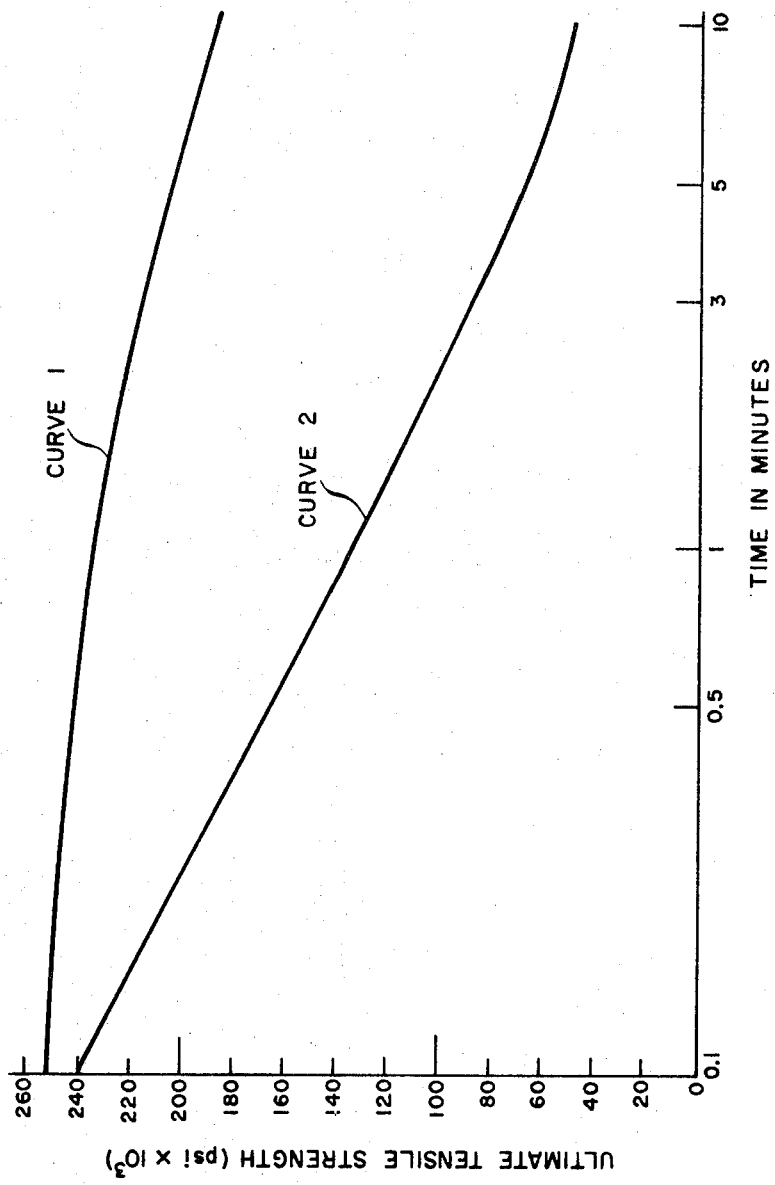
INVENTORS
JÓSE L. CAMAHORT
MARIO P. GOMEZ
By George C. Sullivan, agent
Richard H. Bryer
Attorney

BORON NITRIDE COATED BORON FILAMENTS

CROSS-REFERENCE TO RELATED APPLICATIONS

This is a division of application Ser. No. 753,589, filed on Aug. 19, 1968, now U.S. Pat. No. 3,573,969.

BACKGROUND OF THE INVENTION

Interest in composite materials wherein various types of high-strength, high-modulus filaments, both metallic and nonmetallic, are incorporate in metal matrices to enhance the strength and stiffness properties of the metal matrices has greatly increased in recent years. Commercially available filaments of boron possess properties which make them quite attractive as reinforcement agents for structural composites. For example, a typical 4-mil diameter boron filament, made by heating a 0.5-mil diameter tungsten wire in an atmosphere of boron chloride-hydrogen exhibits an average strength of 450,000 p.s.i., an elastic modulus of 60 million p.s.i. and a density of 0.095 pounds per cubic inch. Resin matrix boron composites are currently used as structural parts in aerospace applications. Resin matrices, however, have low mechanical strength and also fail in the area of high-temperature applications since they decompose at moderate temperatures.

Consequently, it would be advantageous to use metal and metal alloy matrices that not only possess good mechanical strength but also permit the use of such composites at much higher temperatures then resin matrices due to their higher melting point. Heretofore, it has been impossible, however, to directly incorporate boron filaments into metal and metal alloy matrices by liquid metal processing techniques. The chemical reactivity of boron with structural metal matrices such as aluminum, magnesium, nickel, titanium, iron, beryllium, chromium and alloys thereof is well documented. For example, the prolonged contact of aluminum and boron at temperatures in the order of 400° to 500° C. results in the degradation of the boron filaments due to formation of the brittle compound aluminum boride. This compound, and other brittle metal borides, cause premature fracture of the boron filaments upon the application of stresses. The usefulness of boron filaments in metal matrices is accordingly minimized since no substantial strength improvements are realized.

To minimize such boron filament degradation, metal matrix composites, as now fabricated by the art, must be formed at low temperatures by using cumbersome and expensive fusion bonding techniques. By these techniques, the boron filaments are arranged with, for example, aluminum foil in sandwich fashion so that boron filaments alternate with layers of aluminum. A firm bond between the aluminum and boron filaments is achieved by heating and compressing the sandwich. Since the temperature for this process of fusion has to be held lower than 600° C. in order to avoid chemical reaction between boron and aluminum, pressures approaching 10,000 p.s.i. are required. This is rather impractical for sandwiches of say 1 square foot in size since forces as much as 1,500,000 pounds would be needed for compression. Further, the resulting composites are severely limited in their high temperature capabilities due to reaction between the boron and metal at temperatures in the order of 500°C. and higher and the resulting formation of brittle metal borides.

The desirability of using liquid metal processing techniques and high temperature forming and joining operations to produce structural composite bodies containing boron has long been recognized. To date, however, satisfactory composite bodies formed by this technique have not been realized due to boride formation. It has been recognized by the art that theoretically this difficulty could be overcome by the use of a diffusion barrier between the boron filaments and the metal matrices since such barriers should act to limit or prevent deletrious reactions while still providing adequate bonding for effective filament-matrix load transfer. Several metal and inorganic compound coatings have been tested in conjunction with boron filaments, but all such coatings suffer from serious disadvantages. A silicon compound coating does not wet molten metals such as aluminum and fails to provide adequate bonding between the boron filament and the metal matrix. Silver and nickel have been tested and been found to be ineffectual.

Theoretically, boron nitride should act as a highly satisfactory diffusion barrier since it is essentially inert to both boron and the metal matrices of interest at elevated temperatures. Heretofore, however, it has been impossible to obtain a satisfactory boron nitride coating on boron that would prevent degradation of the boron filament during fabrication of the composite at temperatures in the order of 500° C. and higher and use of the composite at such elevated temperatures.

SUMMARY OF THE INVENTION

Briefly, in accordance with the invention, there is described a process for the surface nitriding of boron filaments, which filaments are then uniquely suitable for incorporation into various metal matrices. The process of the invention has been found to result in boron nitride coatings which obviate the aforementioned difficulties and problems associated with the use of boron filaments as reinforcement materials in metal matrices.

In particular, by the process of the invention, degradation of the boron filament is essentially precluded during formation of the boron nitride coating on the boron filament and further during the incorporation of the coated filament into metal matrices. Further, the boron nitride coating substantially acts to minimize diffusion between boron filaments and metal matrices at elevated temperatures. As a result, metal matrices incorporating boron filaments processed in accordance with the invention exhibit outstanding properties. For example, boron-aluminum composite rods (0.020 inches in diameter) were prepared by identical liquid infiltration techniques using as-received boron filaments and boron filaments nitrided by the process of the invention. The composite rods containing the nitrided filaments averaged about 180,000 p.s.i. in ultimate tensile strength while those rods containing the uncoated filaments averaged only about 110,000 p.s.i. in ultimate tensile strength.

More particularly, the method of the invention involves initially forming a liquid boron oxide coating on the boron filament and subsequently converting the liquid oxide coating to a solid, continuous boron nitride coating. It has been determined that the efficacy of the process is dependent upon this specified sequence of processing steps. Formation of the liquid boron oxide coating is a prerequisite to the obtaining of a continuous boron nitride coating. Applicants have found it impossible to directly produce a boron nitride coating, for example, by reacting the boron filament with nitrogen or ammonia or to replace the liquid oxide intermediate coating with a solid boron oxide coating without degrading the filament or forming a nitride film that is ineffectual in protecting the filament at elevated temperatures.

A further advantage accruing to the boron nitride coated filaments of the invention is that the coating is thick enough to be an effective diffusion barrier and yet thin enough to have a negligible effect on the boron filament strength. Since boron nitride is much weaker than boron, it is desirable to make the boron nitride coating as thin as possible so as not to substantially decrease the volume fraction of boron in the composite material. For example, a one-sixth mil thick boron nitride coating on a 4-mil diameter boron filament would constitute 14.5 volume percent of the coated filament with a corresponding loss in filament strength given by the law of mixtures:

$$\sigma = f_{BN}\sigma_{BN} + (1 - f_{BN})\sigma B$$

where $\sigma$ is the ultimate tensile strength and $f$ the volume fraction.

BRIEF DESCRIPTION OF THE DRAWING

The invention may be more easily understood by reference to the drawing which on coordinates of ultimate tensile strength and time in minutes is a semilog plot showing mechanical strength degradation of boron filaments as a function of time of exposure of the filaments in molten aluminum maintained at 700° C. Curve 1 of the drawing shows the mechanical strength degradation of boron filaments protected by the boron nitride coating of the invention. Curve 2 of the drawing shows the mechanical strength degradation of as-received boron filaments which were not coated in accordance with the method of the invention. As evidenced by these curves, a rapid deterioration of a mechanical strength was exhibited by the unprotected filaments. The coated boron filaments showed significantly less degradation of mechanical strength. The data depicted by this drawing was obtained by immersing both coated and uncoated boron filaments in the molten aluminum maintained at 700° C. for one-half, 1, 3, 5 and 10 minutes and then tensile testing the filaments. All coated boron filaments were made by the technique hereinafter described in conjunction with example 1 of the specification.

DESCRIPTION OF THE PREFERRED EMBODIMENTS

The method of the present invention involves the formation of a continuous adherent boron nitride coating on boron filaments, which filaments are then uniquely suitable for incorporation into metal and metal alloys matrices for use as structural composite materials. The process of the invention for nitriding the surface of boron filaments results in a boron nitride coating which protects the filaments from chemical attack by the metal and metal alloys matrices and further minimizes diffusion between the filament and the matrix at elevated temperatures. The method is carried out by initially forming a uniform liquid boron oxide coating on the boron filament and subsequently converting the liquid oxide coating to a solid continuous boron nitride coating.

The liquid boron oxide coating is readily formed by several techniques. One preferred technique involves heating the boron filament surface in an oxidizing atmosphere such as air, oxygen and mixtures of oxygen with nitrogen or other inert gases. Minimum temperatures in the order of 560° C. are required to form the liquid oxide coating required by the invention. During oxidation of the boron filament amorphous, that is, vitreous boron oxide is formed which does not have a definite melting point. The softening range for this oxide is between 560° and 630° C. Below about 560° C., the viscosity of the oxide is sufficiently high as to make the coating, for the purpose of the invention, a solid oxide coating. It has been determined that a solid oxide coating does not form a continuous layer around the boron filament and accordingly, does not prevent degradation of the boron filament at elevated temperatures due to the boron-metal matrix reaction which results in formation of brittle metal boride. Additionally, it has been found that degradation of the boron filament at temperatures below about 560° C. during formation of the boron oxide coating is a serious problem due to the prolonged reaction times required to form the coating. Boron filaments are known to degrade with increasing reaction times in oxidizing atmospheres due to formation of the brittle nonuniform boron oxide.

As temperatures are increased above 630° C., the liquid boron oxide coating becomes less viscous and tends to flow under the influence of gravity. Up to about 800° C. this flow, however, is negligible. Above 800° C., the flow is such as to cause reduction in the thickness of the coating. For temperatures in the order of 800° to 1,000° C. and higher, evaporation of the boron oxide coating tends to further reduce the coating thickness. Since, in accordance with the invention, it is necessary to form an essentially continuous oxide coating, maximum temperatures in the order of 800° C. are preferred. However, it has been found that a continuous coating results when the coating thickness is in the order of 0.1 microns. Since coating thickness is readily determinable by a chemical analysis and optical microscopy, it is within the skill of the art to utilize temperatures above 800° C. provided such temperatures result in a minimum coating thickness in the order of 0.1 microns. Generally, temperatures in excess of 1,000° C. are to be avoided, however, since in an oxidizing atmosphere, degradation of boron filament due to formation of brittle nonuniform boron oxide is quite pronounced, to the detriment of the strength characteristics of the filament. Based on the preceding, a preferred temperature range is from 560° to 800° C. with an optimum range being between about 560° to 650° C. At a temperature of 650° C., a reaction time of about 30 seconds has been found adequate for forming a continuous liquid boron oxide coating. Since temperatures and time are interdependent, higher temperatures will require shorter times and lower temperatures will require longer reaction times.

A liquid boron oxide coating also may be formed on the filament by pulling the filament through molten boron oxide or by passing the filament over an evaporating boron oxide melt.

The liquid boron oxide coated filament is then heated in a nitrogen containing atmosphere such as ammonia and an ammonia-nitrogen mixture to convert the liquid boron oxide coating to a solid, essentially continuous boron nitride coating. While nitridation begins at temperatures in the order of 350° C., temperatures in the order of 800° C. and higher are preferred since the resulting increased reaction rate improves diffusion of the nitriding gases into the boron oxide layer and causes formation of a higher purity boron nitride coating. Generally, temperatures in excess of 1,100° C. are to be avoided, however, since degradation of the boron filament at such elevated temperatures becomes significant. For temperatures in the range of about 800° to 1,100° C. the boron filament undergoes a small nonsignificant amount of degradation. Based on the preceding, a preferred temperature range is from about 600° to 1,100° C. with an optimum range being between about 800° to 1,100° C. Within these ranges, it has been determined that a reaction time of about 30 seconds at 1,060° C. and about 2 minutes at 900° C. is satisfactory in converting the oxide coating to a continuous boron nitride coating. Since temperatures and times are interdependent, higher temperatures will require shorter times and lower temperatures will require longer reaction times.

Pure nitrogen atmospheres have been found to be unsatisfactory since they require temperatures in the order of 1,600° C. to convert the oxide coating to the nitride coating, and, as previously discussed, such elevated temperatures cause serious degradation of the underlying boron filaments. Consequently, nitrogen-containing atmospheres which are sufficiently reactive to cause nitridation in accordance with the preceding discussion without attack of the underlying boron filament or formation of undesirable byproducts are utilized. Such atmospheres are considered within the skill of the art.

As has been previously discussed, a continuous boron nitride coating results when the minimum coating thickness is in the order of 0.1 microns. As has been previously discussed, it is desirable to utilize thin boron nitride coatings on the boron filaments, since as the volume fraction of the boron nitride coating on the boron filament increases, the ultimate tensile strength of the boron nitride coated filament decreases. Generally, applicants have found a coating thickness of 0.7 microns to be a maximum, practical thickness in view of the preceding. However, thickness above 0.7 microns can be utilized if the corresponding loss in filament strength is not a significant factor in the use of the filament. The thickness of the boron nitride coating depends on the thickness and flow and evaporation characteristics of the liquid boron oxide coating, which varies as discussed herein with the reaction times and temperatures utilized during the oxidation and nitridation steps. Commensurately, with the discussion relating to formation of the boron-oxide-coated filament, it has been determined that for nitriding temperatures in the order of 1,000° C., some evaporation of the boron oxide coating occurs prior to its conversion to boron nitride.

A continuous nitridation process has been devised whereby one or more boron filaments were pulled through two reactors containing respectively, air and ammonia. A small amount, for example, 5 volume percent of nitrogen or hydrogen gas is preferably added to the ammonia atmosphere to prevent excessive cracking of the ammonia at elevated temperature. Flow rates of ammonia in excess of the stoichiometry amount are preferably maintained in the nitriding reactor. Suitable reaction times are easily achieved by varying the filament takeup speed. The following reactions are assumed to take place:

$$4B(s)+3O_2(g) \rightarrow 2B_2O_3 \quad (1)$$
$$B_2O_3(1)+2NH_3(g) \rightarrow 2BN(s)+3H_2O(g).$$

The resulting nitrided boron filaments are uniquely suitable for incorporation into structural metal and metal alloy matrices by liquid infiltration techniques or metal casting methods. A preferred composite fabrication process involves pulling a number of the nitrided boron filaments through the desired molten metal bath to produce a composite wire or rod wherein the filaments are arranged and aligned properly. The filaments enter the molten metal bath through separate holes on an entrance disk which ensures sufficient space between the filaments so that all filament surfaces are wetted. The filaments then exit together through an orifice of any desired size and shape. The resulting composite rods or wires are then used to produce larger composite bodies, such as sheets and tapes by passing the rod or wire through a second molten bath of the same metal or a lower melting metal or alloy. For example, a 0.020 inch diameter boron-aluminum composite rod was produced by pulling 16 nitrided boron filaments through a molten aluminum bath. Ten of these composite wires were then pulled through a second molten aluminum bath to produce a 0.20-inch wide by 0.020-inch thick composite tape. The boron nitride coating formed on the boron filaments by the process of the invention protected the filament from chemical attack by the molten aluminum during this liquid infiltration process.

Specific examples of procedures used in the preparation of materials of the invention are given below: These examples are to be construed as illustrative only and not as limiting in any manner the scope and spirit of the invention as defined by the appended claims.

Example 1

A single boron filament was pulled continuously through a reactor containing air at 650° C. and then through a second reactor containing ammonia at 900° C. Reaction times of about 2 minutes in each reaction were maintained by a filament takeup speed of 0.5 feet per minute through the two 12-inch long quartz reactors. An ammonia flow rate of about 2 cubic feet per hour was maintained in the nitriding reactor. Chemical analysis and optical microscopy showing a boron nitride coating of about 0.3 to 0.4 micron thickness on the boron filament. This coating was an effective diffusion barrier in aluminum, aluminum alloy, nickel, titanium and glassy carbon.

EXAMPLE 2

Sixteen boron filaments were passed continuously through two successive 1-inch diameter 12-inch long stainless steel reactors containing air at 650° C. and an ammonia—5 percent nitrogen atmosphere at 1,060° C. respectively. A filament takeup speed of about 2 feet per minute resulted in reaction times of about 30 seconds in each reaction. Gas flow rates were 2 cubic feet per hour of ammonia and 0.1 cubic feet per hour of nitrogen in the nitriding reactor. Optical microscopy showed a 0.1 to 0.2 micron thick boron nitride coating on the filaments. This coating showed excellent protective action in molten aluminum during liquid infiltration experiments.

EXAMPLE 3

An experiment similar to that described in example 2 was performed with the oxidizing reactor containing air at about 540° C. and the nitriding reactor containing a mixture of ammonia—5 percent nitrogen at about 1,000° C. No effective boron nitride coatings were obtained under these conditions using filament takeup speeds of from about 0.5 feet per minute to about 2 feet per minute. Such filaments were attacked by molten aluminum during subsequent composite fabrications resulting in a average ultimate tensile strength of only 100,000 to 110,000 p.s.i. In contrast, utilizing a temperature of 650° C. in the oxidizing reactor, all other conditions being the same, resulted in a composite having an average ultimate tensile strength of from about 180,000 to 195,000 p.s.i. This example illustrates the criticality of forming a liquid boron oxide coating at a temperature of about 560° C. or higher.

What is claimed is:

1. A boron filament useful as a reinforcement filament in composite metal and metal alloy matrices and suitable for incorporation into said matrices by liquid infiltration and metal casting techniques and characterized by having an adherently bonded, essentially continuous surface coating of boron nitride at least about 0.1 microns thick.

2. A boron filament in accordance with claim 1 having ultimate tensile strength characteristics in accordance with curve 1 of the drawing.

3. A boron filament in accordance with claim 1 which is essentially inert during liquid infiltration and metal casting techniques and in metal and metal alloy matrices at temperatures of 500° C. and higher.

* * * * *